Patented Feb. 12, 1952

2,585,197

UNITED STATES PATENT OFFICE 2,585,197

OIL-FREE WRINKLE FINISH COATING

Richard K. Walton, Montclair, N. J., assignor to Union Carbide and Carbon Corporation, a corporation of New York No Drawing. Application April 14, 1950, Serial No. 156,055

6 Claims. (Cl. 260—44)

This invention relates to oil-free coatings which in film form and upon baking yield a wrinkle finish closely resembling the wrinkle finishes hitherto obtained from coatings of vehicles based on China-wood oil or similar fatty oil having a conjugated double bond structure. More particularly, the invention relates to oil-free coatings prepared from heat-hardenable resins obtained by reacting together a secondary aliphatic amine and phenol, and a subsequent condensation reaction of the amine and phenol reaction product with formaldehyde.

Heretofore, practically all commercial wrinkle finishes required the use of a conjugated type drying oil and a drier or siccative. The fatty oil, in some instances, was modified by reaction with oil-soluble resins. These oil-containing coatings while yielding satisfactory wrinkle patterns were not appreciably resistant to alkalis or solvents. For example, a typical oleo-resinous wrinkling finish resists the attack of a five per cent aqueous solution of sodium hydroxide at refluxing temperatures for less than one hour before disintegrating. On immersion in boiling toluene, such a finish would lift off its base in a matter of minutes. Moreover, the major supply of conjugated fatty oils is obtained from foreign lands and is not always available in the quantities required by industry.

It has now been found that the heat-hardenable resins obtained by initially reacting a molar quantity of phenol with from 0.5 mol to 1.0 mol of a secondary aliphatic amine to form a preliminary reaction product, which is then reacted with between 1.25 and 2.0 mols of formaldehyde (aqueous or anhydrous) or a polymer of formaldehyde such as paraform, can be employed as the sole vehicle of solids in a coating composition, which upon proper baking will yield a wrinkle-type finish. Such oil-free coatings exhibit greatly superior resistance to alkalis, a typical finish withstanding a refluxing 5% aqueous NaOH solution for two to three hours, or a 10% aqueous NaOH solution at room temperature for fifty hours.

The phenomenon of wrinkling by an oil-free resinous material in film form is totally unexpected and appears to be specific to resins prepared as herein described. Thus it has been found that the same reactants, if otherwise reacted, as by simultaneously heating together the phenol, amine, and formaldehyde, yield a heat-hardenable resin, which, when baked in film form deposits smooth, glossy coatings. Alternatively, if the phenol and formaldehyde are first condensed together to form a fusible heat-hardenable resin, which is then reacted with amine, a product is obtained that also yields smooth films free from any sign of wrinkling. The order in which the several reactants are reacted is therefore one of the critical factors in the practice of the invention.

Another critical factor is the temperature at which films of the resin are dried or baked. Merely drying the resin films at room temperature, or at elevated temperatures up to about 100° C., does not result in wrinkle films. Baking at a temperature of at least 120° C. and preferably between 135° C. and 190° C. is required for best results.

Still another critical factor in the production of suitable resins is the molar reactant proportion of amine to phenol. With less than an 0.5 mol quantity of amine reacted per mol of phenol, the wrinkle finish does not develop uniformly on baking, the film being interspersed with smooth, glossy areas. More than one mol of amine per mol of phenol is also unsuitable in that it does not readily combine with the phenol, and hence remains free to react with the subsequently added formaldehyde, forming water-sensitive condensation products.

The amount of formaldehyde, or a polymer thereof, is critical mainly from the aspect of providing sufficient methylene groups for crosslinking or hardening. While theoretically an equimolar amount of formaldehyde on the phenol should be sufficient for this purpose, it has been found that at least about 1.2 mols per mol of phenol and preferably more is required to obtain a satisfactory rate of heat-hardening and adequate resistance to alkalis and solvents. The theoretical maximum amount of formaldehyde which could be reacted with the phenol is three mols per mol thereof. But, again, in actual practice it has been found difficult to actually combine more than two mols formaldehyde per mol phenol, any excess over two mols being lost upon dehydration or baking of the resin.

The amines having utility in the reaction are alkyl secondary amines having the formula

where R and R′ are the same or different alkyl radicals having from 1 to 8 carbon atoms. Typical secondary amines contemplated by the above definition are dimethyl amine, diethyl amine, di-isopropyl amine, ethyl-butyl amine, di-n amyl amine and di-2-ethyl-hexyl amine. An unsaturated secondary amine, specifically diallylamine, has also been found effective. On the other hand, primary alkyl or aromatic amines as reactants in the same type of reaction fail to yield resins characterized by wrinkling.

Preparation of the resinuous amine condensation products having wrinkling properties when applied in film form, is, as heretofore mentioned, a two-stage type of reaction. In the first stage, between 0.5 and 1.0 mol of a suitable amine is added slowly to a molar quantity of phenol, whereupon an exothermic reaction occurs, the temperature rising to upwards of about 100° C. This initial reaction is believed to form a salt type of product that may be represented as:

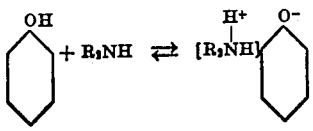

In the second stage, the initial reaction product is first preferably cooled to about 40° C. since a second exothermic reaction occurs when formaldehyde is added. The required amount of formaldehyde is preferably added in small increments to avoid a too violent reaction. After all the formaldehyde has been added, the reaction mixture is heated to about 100° to 130° C. while removing water of condensation. A viscous resin forms as dehydration is continued. For best coating properties, it is preferred to remove substantially all the water of condensation, as well as water introduced by the use of formalin when this is employed as the source of formaldehyde. A water content of less than 5.0% is readily obtained by heating the wet resin under subatmospheric pressure. After dehydration, the viscosity of the viscous resin can be increased by judicious heating, care being exercised to avoid gelation.

The fusible dehydrated resin is soluble in aliphatic monohydric alcohols, the lower fatty acid esters of such alcohols, and in ketones, and glycol ethers. Of these, ethyl alcohol, butyl alcohol, the isomeric amyl alcohols, ethyl acetate, butyl acetate, butyl propionate, acetone, ethylmethyl ketone, diacetone alcohol, ethylene glycol monoethyl ether, diethylene glycol monomethyl ether have been found economically and practically satisfactory as solvents for diluting the resin to suitable application viscosity without interfering with wrinkle development.

Conventional monomeric ester type plasticizers such as diethyl phthalate, dibutyl phthalate, polyethylene glycol, di-2-ethyl-hexoate and the like are compatible with the resin prior to its heat-conversion. After heat-conversion, such plasticizers are more or less incompatible with the heat-hardened resin as evidenced by sweat-out of the plasticizer from the film.

Polyesters such as the fusible glyceryl phthalate resins, glycol maleates, and similar polyhydric alcohol esters of dicarboxylic acids are compatible in moderate amounts, up to about 50% by weight, with the amine modified phenolic resins in heat-hardened form, and effect a desirable plasticizing function. For example, the unmodified amine-phenol-formaldehyde resin as a baked coating tends to crack from the surface of a steel sheet, if the sheet is bent on a ½" radius. By adding about 20% polyester resin, the flexibility of amine resin is benefited to the extent that in usual coating thickness it may be bent amount a ⅛" radius without cracking.

The amine-phenol-formaldehyde resins of this invention may be pigmented if desired with conventional pigments such as zinc oxide, carbon black, white lead, Prussian blue, chrome green and the like. In general, the pigments tend to reduce the size and rugosity of the wrinkles and yield a finer wrinkle pattern.

The following examples are given in further exemplification of the invention.

*Example 1*

A reaction vessel equipped with stirrer and a reflux condenser was charged with 94 grams (1 mol) phenol. Then 73 grams (1 mol) diethyl amine were gradually added, the solution developing a red color as an exothermic reaction began. The reaction temperature went up to 100° C. in 10 minutes. The mass was cooled to about 40° C. and 121 grams formalin (37%) equivalent to 1.5 mols of HCHO were added causing a second exothermic reaction to take place, the temperature going up to 90° C. The reaction mass that this stage was a viscous resin with a refractive index at 25° C. of 1.5180. The resinous mass was refluxed at 100° C. for 75 minutes, the refractive index value increasing to 1.5350. The resin was then dehydrated to a total water content of less than 5% by heating to 85° C. at less than atmospheric pressure (50 mm. mercury pressure). The distillate from the dehydration step had a strong amine odor. The resin was reacted further by heating at 120° C. under atmospheric pressure until a sample exhibited a gel time at 160° C. of 150 seconds. The viscous amber colored resin was then dissolved in an equal amount by weight of ethylene glycol monoethyl ether, yielding a solution of about 50% solids and a viscosity of 70 centipoises. The solution was applied by dipping onto degreased steel panels. The panels were air dried to remove part of the solvent and then baked in an oven for one hour at 135° C. A pleasing wrinkled film formed at the end of about 10 minutes. Other panels were baked under the same conditions, but without resort to air drying prior to baking. These panels also yielded uniform wrinkled films.

*Example 2*

An amine resin made with 0.5 mol of amine per mol phenol was obtained, by gradually adding to 282 grams (3 mols) phenol, 109.5 grams (1.5 mols) diethyl amine which resulted in an exothermic reaction. The mixture was then held at 100° C. for 10 minutes by refluxing control. Then 304 grams of formalin (37% CH₂O by weight) were added to the mixture and the reaction was continued for 30 minutes under reflux conditions. At this stage, the refractive index of the resinous mass was 1.5700. The resin was dehydrated to a water content of less than 5%, and the dehydrated resin held at 120° C. until a sample exhibited a gel time of 3 minutes at 150° C. The fusible resin was then dissolved in 250 grams ethylene glycol monoethyl ether, the solution having a non-volatile content of 44.5% and a viscosity of 250 centipoises. The solution was sprayed on steel panels producing a film having a dry thickness of 0.001 inch. The panels were baked at 190° C. for 15 minutes; the film formed a wrinkled pattern after the first two minutes of baking.

Example 3

A wrinkling coating based on an amine-phenol resin made with a higher amount of formaldehyde was made by reacting 188 grams (2 mols) phenol with 146 grams (2 mols) diethylamine for 10 minutes at 100° C. Then 284 grams formalin (37% $CH_2O$ by weight) were slowly added to the mixture, which was then refluxed for 45 minutes forming a viscous resinous mass ($n$ 1.5342). The resin was dehydrated to a water content of 3.2% and then further reacted by heating at 125° C. until a sample had a gel time of 330 seconds at 150° C. The resin was then dissolved in 200 grams ethylene glycol monoethyl ether; total yield 537 grams and non-volatile content 52%.

Glass sheets were dipped into the solution and then baked 30 minutes at 160° C.; the baked film had a uniform wrinkled pattern.

Example 4

A wrinkle coating resin made from dimethylamine was prepared by adding 180 grams of a 25% aqueous solution of dimethylamine (equivalent to 1 mol) to 188 grams (2 mols) of phenol. In this instance only a slight exothermic reaction occurred, since the water content of the amine diluted the reaction mass. After 10 minutes refluxing at 95° C. of the amine-phenol solution, its color changed from a faint pink to a decided green. Then, 202 grams formalin (37% $CH_2O$ by weight) were slowly added to the solution; and the mixture refluxed until a highly viscous liquid resin was formed having a refractive index of 1.596. The liquid resin was dissolved in 200 grams iso-amyl alcohol to reduce its viscosity for easier stirring while being dehydrated at subatmospheric pressure to a water content of 4.8%. The resin solution was then further reacted at about 120°–130° C. until it had a gel time of 380 seconds at 150° C. Thereupon the solution was additionally diluted by adding thereto 100 grams isopropyl alcohol. Aluminum sheets were coated with the resultant solution and then baked for 15 minutes at 190° C., the coating forming an amber-colored wrinkled finish.

Example 5

A wrinkle coating resin based on an unsaturated amine was obtained by cautiously mixing together 188 grams (2 mols) phenol and 194 grams (2 mols) diallyl amine. The mixture was further reacted by heating under reflux condition to 100° C. for 10 minutes. Then 242 grams formalin (37% $CH_2O$ by weight) were slowly added to the phenol-amine reaction product. This mixture was then reacted by heating under reflux conditions for 30 minutes, whereby a liquid resin was formed having a refractive index of 1.5315. The liquid resin was substantially dehydrated by heating under subatmospheric pressure, and then the resin's viscosity was increased by further heating for 20 hours at 120°–130° C., until it had a gel time of about 21 minutes at 150° C. The resin was fluid enough to permit its use for coating purposes without dilution by solvents. The resin as a coating required higher baking temperatures (180°–190° C.) to develop a fully cured condition for a baking cycle of 20 to 30 minutes. Baked films of this resin had a more uniform wrinkle pattern, over a range of different film thickness (0.0001–0.0015 inch) than the resins made with dimethyl amine or diethyl amine.

Example 6

A pigmented wrinkling enamel was prepared by ball milling for 3 days a charge consisting of 180 grams of the 44.5% resin solution from Example 2, and 5.8 grams carbon black. A satisfactory dispersion was obtained, the enamel being of a consistency suitable for dipping. Steel panels coated with the enamel were baked 15 minutes at 190° C., the baked film having a smoother wrinkled finish than was obtained with the unpigmented resin solution of Example 2.

Example 7

A more flexible wrinkle finish resulted from adding to 50 grams of the resin solution prepared in Example 1, 10 grams of a 50% xylene solution of a viscous polyester (acid number=10) obtained by esterifying substantially stoichiometrical quantities of triethylene glycol and the Diels-Alder dibasic adduct reaction product of maleic anhydride and cyclopentadiene. A homogeneous solution was obtained when baked as a film on steel plate. The baked film had a wrinkle pattern substantially the same as the unmodified resin solution of Example 1, but was considerably more flexible in that the steel plate could be bent on a ⅛ inch radius without fracture of the film.

The wrinkling resins of this invention exhibit good adhesion to various metallic surfaces, such as steel, tin plate, aluminum, brass and magnesium. They can also be applied to ceramic surfaces such as glass and porcelain. Due to the necessity for baking at moderately elevated temperature to develop the wrinkling pattern, the resins are not well adapted for coating wood surfaces or paper, in that charring or degradation of the cellulose occurs.

Applied coating thickness has an effect on size of the wrinkles. A coating thickness of 0.0001 inch has numerous fine wrinkles, whereas a heavier coat such as 0.002 inch thickness generally has fewer but coarser wrinkles.

The amine-phenol-formaldehyde resins suitably diluted with volatile organic solvents can be applied to surfaces in various conventional ways, including brushing, spraying, dipping and roller coating.

What is claimed is:

1. Heat-hardenable coating resin characterized by wrinkle formation upon heat-hardening in film form, said resin being the condensation reaction product of between 1.2 and 2.0 mols formaldehyde, with a reaction product of one mol phenol and between 0.5 and 1.0 mol of a secondary amine selected from the group consisting of diallylamine and aliphatic amines having the structure

wherein R and R' are each an alkyl radical having from 1 to 8 carbon atoms.

2. A coating resin as defined in claim 1 plasticized with a polyester of a polyhydric alcohol and dicarboxylic acid.

3. Process for preparing a heat-hardenable resin characterized by wrinkle formation upon heat-hardening in film form, which comprises initially reacting a molar quantity of phenol with between 0.5 and 1.0 mol of a secondary amine selected from the group consisting of diallylamine, and aliphatic amines having the formula

wherein R and R' are each an alkyl radical having from 1 to 8 carbon atoms, then reacting this initial product with between 1.2 and 2.0 mols of formaldehyde to form a fusible resinous condensation product, and then dehydrating the resinous product to yield a fusible and soluble resin.

4. Process for forming a wrinkled coating which comprises applying to the surface of a base a resin as defined in claim 1 dissolved in a volatile solvent, drying the resin solution and baking at a temperature between 120° C. and 190° C. to simultaneously heat-harden the resin and form a wrinkled finish.

5. Coating composition comprising a solution in a volatile solvent of a heat-hardenable condensation product of formaldehyde in amount between 1.2 and 2.0 mols and a reaction product of a mol of phenol and between 0.5 and 1.0 mol of a secondary amine selected from the group consisting of diallylamine and aliphatic amines having the formula

wherein R and R' are each an alkyl radical of from 1 to 8 carbon atoms.

6. A metal base having a wrinkle coated surface comprising a heat-hardened condensation product of formaldehyde in amount between 1.2 and 2.0 mols and a reaction product of a mol of phenol and between 0.5 and 1.0 mol of a secondary amine selected from the group consisting of diallylamine and aliphatic amines having the formula

wherein R and R' are each an alkyl radical of from 1 to 8 carbon atoms, said condensation product having been heat-hardened at a temperature between 120° and 190° C.

RICHARD K. WALTON.

REFERENCES CITED

The following references are of record in the file of this patent:

UNITED STATES PATENTS

| Number | Name | Date |
|---|---|---|
| 1,783,166 | Bruson | Nov. 25, 1930 |
| 2,036,916 | Bruson | Apr. 7, 1936 |
| 2,341,907 | Cheetham | Feb. 15, 1944 |
| 2,378,575 | Norton | June 19, 1945 |